United States Patent [19]
Shimizu et al.

[11] Patent Number: 5,935,204
[45] Date of Patent: Aug. 10, 1999

[54] SYSTEM FOR A MULTI-PROCESSOR SYSTEM WHEREIN EACH PROCESSOR TRANSFERS A DATA BLOCK FROM CACHE IF A CACHE HIT AND FROM MAIN MEMORY ONLY IF CACHE MISS

[75] Inventors: Toshiyuki Shimizu, Yokohama; Hiroaki Ishihata, Tokyo, both of Japan

[73] Assignee: Fujitsu Limited, Kawasaki, Japan

[21] Appl. No.: 08/852,026

[22] Filed: May 6, 1997

Related U.S. Application Data

[63] Continuation of application No. 08/132,827, Oct. 7, 1993, abandoned, which is a continuation of application No. 07/606,912, Oct. 31, 1990, abandoned.

[30] Foreign Application Priority Data

Nov. 8, 1989 [JP] Japan .................................. 1-290684

[51] Int. Cl.[6] .................................................. G06F 13/14
[52] U.S. Cl. .......................... 709/212; 710/22; 712/225; 364/238.4; 364/242.3; 364/964.23; 364/971
[58] Field of Search .................... 364/238.4, 242.3, 364/964.23, 971; 709/212; 710/22; 712/225

[56] References Cited

U.S. PATENT DOCUMENTS

| | | | |
|---|---|---|---|
| 4,322,815 | 3/1982 | Broughton ............................... | 364/900 |
| 4,635,194 | 1/1987 | Burger et al. ............................ | 395/375 |
| 4,663,730 | 5/1987 | Ikeda ....................................... | 364/140 |
| 4,713,755 | 12/1987 | Worley, Jr. et al. ..................... | 395/375 |
| 4,722,050 | 1/1988 | Lee et al. ................................. | 395/375 |
| 4,766,534 | 8/1988 | De Benedictis ......................... | 395/200 |
| 4,937,738 | 6/1990 | Uchiyama et al. ...................... | 345/425 |
| 5,010,477 | 4/1991 | Omoda et al. ........................... | 355/800 |
| 5,056,002 | 10/1991 | Watanke .................................. | 395/425 |
| 5,058,001 | 10/1991 | Li ............................................. | 395/500 |

FOREIGN PATENT DOCUMENTS

| | | |
|---|---|---|
| 53-116041 | 10/1978 | Japan . |
| 57-79541 | 5/1982 | Japan . |
| 63-155254 | 6/1988 | Japan . |
| 1-14660 | 1/1989 | Japan . |

OTHER PUBLICATIONS

P. Stenstrom, "Reducing Contention in Shared–Memory Multiprocessors", *Computer*, vol. 21, No. 11, Nov. 1988, New York, NY, pp. 26–37.

Sawada et al., "A 32–kbyte Integrated Cache Memory", *IEEE Journal of Solid State Circuits*, vol. 24, No. 4, Aug. 1989, New York, NY, pp. 881–888.

D. Shear, "Cache–Memory Systems Benefit From On–Chip Solutions", *EDN Electrical Design News*, vol. 32, No. 25, Dec. 10, 1987, Newton, Massachusetts, pp. 245–260.

M. Leonard, "Cache Tag RAMs Hasten Main Memory Response", *Electronic Design*, vol. 36, No. 5, Mar. 3, 1988, Hasbrouck Heights, NJ, pp. 19–24.

*Primary Examiner*—Thomas C. Lee
*Assistant Examiner*—Chien Yuan
*Attorney, Agent, or Firm*—Staas & Halsey, LLP

[57] ABSTRACT

Data transmission control apparatus which controls data transmission between processing systems via a transmission line, each processing system including a memory system consisting of a main memory and a cache memory. The apparatus addresses data in the main memory by a memory address and gives an instruction to transmit the addressed data; determines whether or not the addressed data is in the cache memory; provides a match signal when the data is in the cache memory; reads the addressed data from the cache memory when instructed by the instruction and when a ready signal and the match signal are provided, and, otherwise reads the addressed data from the main memory; writes the data read into a port; transmits the data written in the port to the another processing system connected to the transmission line; and provides the ready signal when the port is ready to receive additional data.

22 Claims, 8 Drawing Sheets

SYSTEM FOR A MULTI-PROCESSOR SYSTEM WHEREIN EACH PROCESSOR TRANSFERS A DATA BLOCK FROM CACHE IF A CACHE HIT AND FROM MAIN MEMORY ONLY IF CACHE MISS

This application is a continuation of application Ser. No. 08/132,827, filed Oct. 7, 1993, now abandoned, which is a continuation of application Ser. No. 07/606,912, filed Oct. 31, 1990, now abandoned.

BACKGROUND OF THE INVENTION a. Field of the Invention

The present invention relates to an apparatus for controlling data transfer between processor elements in a parallel processing system which interconnects a plurality of processor elements through communication paths.

b. Description of the Related Art

Powerful, high-speed computer systems are being demanded due to recent increases in data quantity and diversification of data processing. In realizing a high-speed computer system, one normally uses a parallel processing system, i.e., a computer system with a plurality of processor elements each of which has its own main memory, and the processor elements are connected in the form of a matrix through communication paths. A parallel processing system can improve processing capability by increasing the number of processor elements. However, when the number of processor elements increases, the frequency of information exchange between the processor elements increases, but the quantity of data for each information exchange (hereinafter called a message) can decrease. As a result, a parallel processing system is required to efficiently transfer a great number of messages between the processor elements.

Further, a main memory of a processor element is often hierarchically structured to increase the performance of the processor element. Therefore, in a parallel processing system consisting of processor elements, main memories having a hierarchical memory structure are also required to effectively transfer messages between processor elements.

Figure 1:
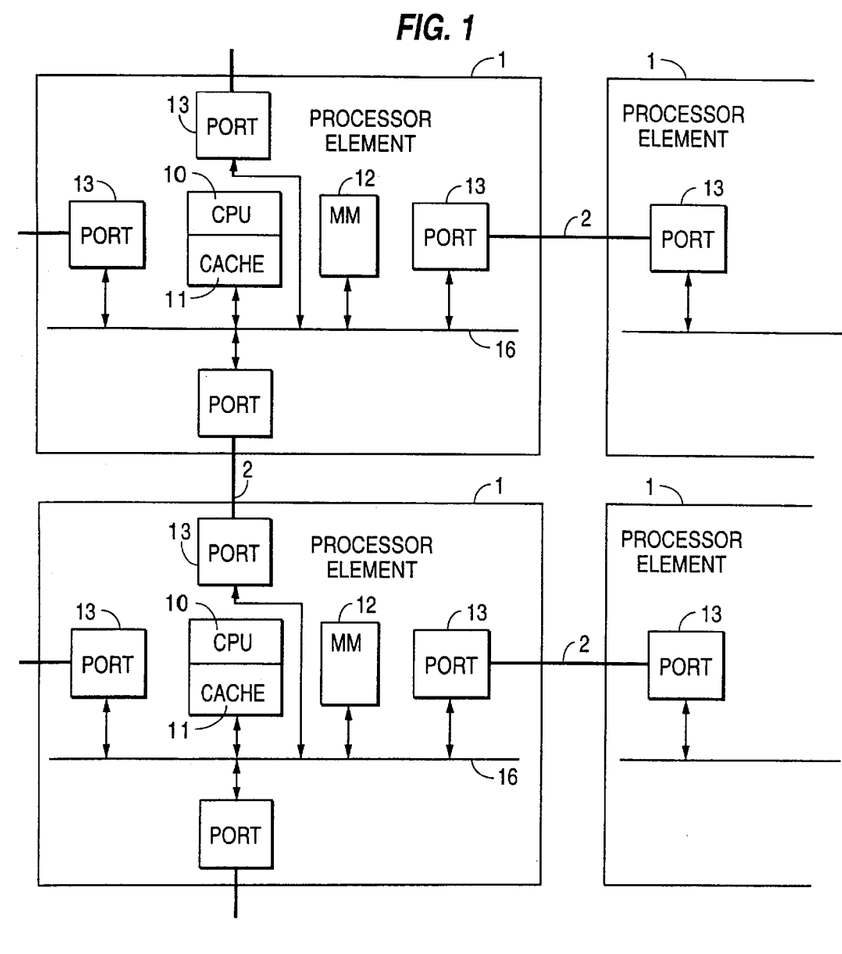
FIG. 1 is a block diagram of a conventional processing system.

FIG. 1 is block diagram of a conventional parallel processing system. Processor elements 1 are interconnected by communication paths 2 via ports 13 to form a matrix. The processor elements execute the same or different programs while mutually exchanging data (messages) over the communication paths 2.

To write data in a port 13 for transmitting the data to another processor element 1, it is necessary to previously determine that the port 13 is ready for receiving the data to be written (called Ready Status). Conventionally, data transmission is carried out by writing data in a port 13 by either hardware in a direct memory access (DMA) mode or software. When data transfer is carried out using hardware, a DMA controller (DMAC) (not shown in FIG. 1), which is connected to the common bus 16 and the port 13, controls data transfer while checking the port 13 for a ready status. On the other hand, when data transfer is carried out by software, a program issues a Move instruction. For example, the program might write data into the port 13 after recognizing a ready status by polling or interrupt processing. In general, to transmit a large quantity of data, DMA transfer by hardware is quite effective. However, data transfer by software is less effective because it takes time for polling or interrupt processing and depends on the instruction execution speed of a central processing unit (CPU).

Figure 2:
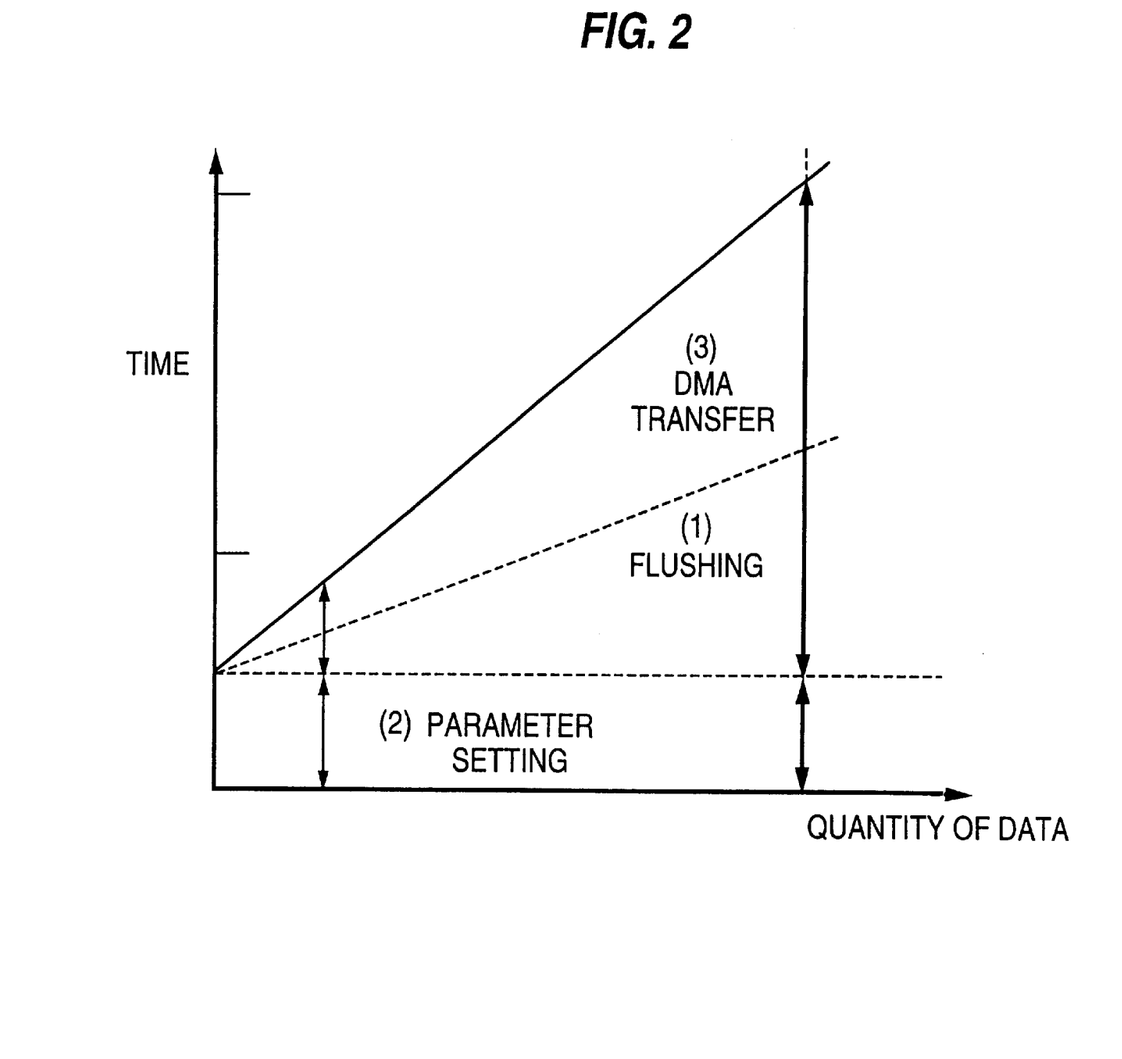
FIG. 2 is a chart illustrating quantity of data vs. time required to transfer the data in a DMA mode.

FIG. 2 is a chart illustrating quantity of data vs. time required to transfer the data in a DMA mode. The chart assumes the CPU 10 of processor element 1 is equipped with a well-known cache memory (CACHE) 11. CPU 10 also needs a flushing function (or flush operation) to write the contents of the cache memory 11 into the main memory (MM) 12 in units of a block (hereinafter called a line) to keep the contents of both memories 11, 12 matched.

Data transfer in a DMA mode is performed between the main memory 12 and a port 13 under the control of an above-mentioned DMAC. Therefore, the time required for DMA transfer is determined by totaling the following three times (1), (2) and (3) illustrated in FIG. 2:

time (1) required to write the data stored in the cache memory 11 into the main memory 12 (flushing), time (2) required to set parameters for data transfer (e.g. starting address of main memory 12, length of the data transferred, address on a record medium, input/output command, etc.), and time (3) required for DMA-mode data transfer per se.

Times (1) and (3) are proportional to the data quantity, while time (2) is constant irrespective of the data quantity.

As is understood from FIG. 2, when the data quantity to be transferred is large, parameter setting is not such a large load. On the other hand, the data quantity is small as in the case of a message exchanged between the processor elements 1, it proves to be quite a large load.

Moreover, since a message, whose quantity may be small, is not generally arranged in a continuous block of data, the data pieces have to be buffered (or gathered in an area of main memory 12 to prepare a message, prior to DMA transfer of the message. On the other hand, a message received by another processor element 1 has to be scattered to the areas of main memory 12 as required.

Thus, one problem of the prior art DMA transfer along a time axis is that parameter setting, flushing, buffering and scattering cause a heavy load to a program and reduce the memory areas for user use due to the areas for buffering use because these are all carried out by the CPU 10. Another problem of the prior art is that checking a port 13 for ready status by a program loop will cause a tremendous load on the CPU 10. Moreover, when a message used to control communication between processor elements 1 is transmitted, a transmission delay caused by such buffering and scattering will reduce the performance of the parallel processing system as a whole.

SUMMARY OF THE INVENTION

An object of the present invention is to provide a data transmission control apparatus which can transmit messages between processor elements quickly, with a reduced memory area for message buffering and with a reduced load on a program.

Another object of the present invention is to provide an economical data transmission control apparatus by sharing the circuits needed for controlling a cache memory.

To achieve the above and other objects, the present invention provides a data transmission control apparatus which controls data transmission between processing systems via a transmission line, each processing system including a memory system consisting of a main memory and a cache memory, and a processor which gives an instruction to transmit data stored in the memory system by addressing the data by a memory address, an instruction unit addresses data in the memory system by a memory address and gives an instruction to transmit the addressed data. A transmission unit, which is connected to the transmission line, transmits the data written therein to the other processing system and provides a ready signal when it is ready to write the next data therein. A judgement unit judges whether or not the addressed data is in the cache memory and, when the addressed data is in the cache memory, provides a match signal. A transfer unit, when instructed by the instruction, acknowledges the ready signal and, based on the ready signal, reads the addressed data from the cache memory if the match signal is provided and, otherwise, from the main memory, and writes the read data into the transmission unit.

These together with other objects and advantages which will be subsequently apparent, reside in the details of construction and operation as more fully hereinafter described and claimed, reference being had to the accompanying drawings forming a part hereof, wherein like numerals referred to like parts throughout.

DESCRIPTION OF THE PREFERRED EMBODIMENTS

Figure 3:
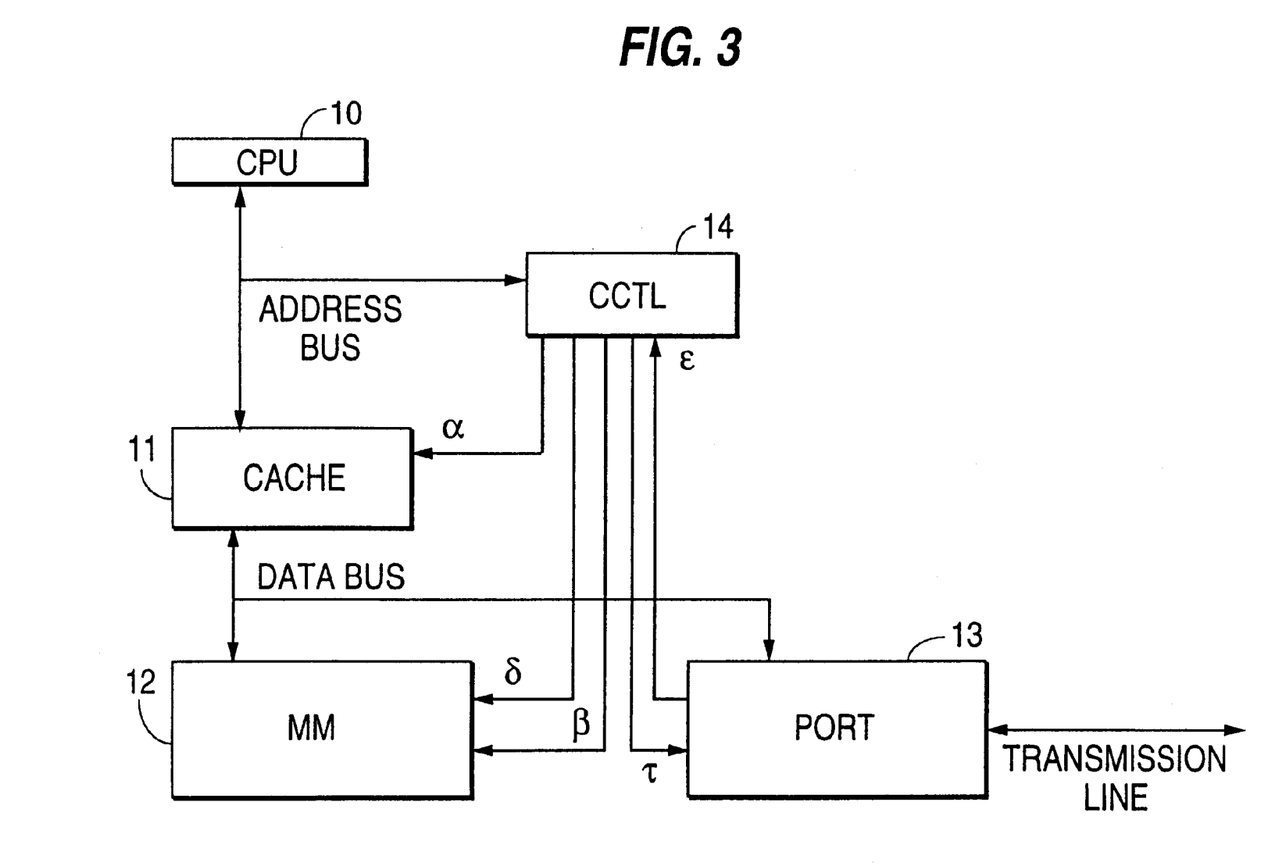
FIG. 3 is a block diagram illustrating basic principles of the present invention.

FIG. 3 is a block diagram illustrating basic principals of the present invention.

The present invention has realized a method to directly transfer a message from a cache memory 11 to a port 13 in order to transmit a message between processor elements 1, and a method to flush the data cached in the cache memory 11 into the main memory 12.

Transferring messages from a cache memory 11 to a port 13 is referred to below as a Line Send operation. Port 13 is a device which transmits and receives data through a transmission line. As a transmitter, when data is written to port 13, it starts transmitting the data. Further, when it becomes ready to write additional data to port 13, it provides a ready signal ε (or holds the ready status in a status register). As a receiver, port 13 receives data from the transmission line and, on receipt of the data, it provides a received signal. Since a receive operation is performed by the processor element 1 in a manner similar to a transmit operation, only a transmission operation (i.e., writing a message in port 13) is disclosed in the following description.

Before describing the first embodiment of the present invention, the cache memory 11 to which the present invention relates is explained. The cache memory 11 holds a copy of data from adjacent addresses of the main memory 12 in units of one line consisting of 16 bytes. Data transfer between the cache memory 11 and the main memory 12 is carried out in units of a line. When the cache memory 11 does not hold the data addressed by the CPU 10 (hereinafter referred to as data not cached or cache miss), a line of data (e.g., 16 bytes) is read from the main memory 12 and stored in the cache memory 11. Accordingly, a system with a cache memory 11 needs a function to write (flush) the contents of the cache memory 11 into the main memory 12 to keep the contents of both memories matched.

FIG. 3 is a block diagram of a data transfer apparatus for controlling data transfer between processor elements in a parallel processing system illustrating the basic principles of the present invention. A cache memory controller (CCTL) 14 controls flush and line send operations.

A flush operation, which transfers the data cached in the cache memory 11 into an address A of the main memory 12, is performed by issuing a flush instruction (i.e., a write instruction with the address operand designated as "A+FLUSH"). In the same way, a line send operation to transfer the data stored at address A of the cache memory 11 main memory 12 into the port 13 is performed by issuing a Line Send instruction (a write instruction with the address operand designated as "A+SEND").

Assuming that a CPU has an instruction format whose address part includes 32 address bits, but only 24 low-order address bits are used for addressing the main memory 12 (including cache memory 11) consisting of up to 16,777,216 bytes. The remaining 8 high-order bits are used for specifying an ordinary memory access, a Flush instruction or a Line Send instruction by designating the high-order 8 bits as hexadecimal 0, 1 and 2, respectively. That is, when the high-order 8 address bits are set to hexadecimal 0 (all zeros), the CPU 10 makes an ordinary memory access, with the CCTL 14 acting as an ordinary cache controller.

When Flushing is specified by setting the high-order 8 address bits to hexadecimal 1, then binary 00000001 and the address of the data to be flushed appears in the high-order 8 address bits and the low-order 24 address bits of the address bus, respectively. When the CCTL 14 interprets an instruction as a Flush instruction and finds that the addressed data is cached in the cache memory 11, it activates a write control signal α to read the data from the cache memory 11 and to output the data read onto the data bus of a common bus interface. Then, the CCTL 14 activates a write control signal β to write the data on the data bus into the main memory 12.

When Line Sending is specified by setting the high-order 8 address bits to hexadecimal 2, the binary 00000010 and the address of data to be line-sent appears in the high-order 8 address bits and the low-order 24 address bits of the address bus, respectively. When the CCTL 14 interprets an instruction as a Line Send instruction, it recognizes that the port 13 is ready to write data therein based on the ready signal ε and that the addressed data is stored in the cache memory 11. Thereafter, the CCTL 14 activates a write control signal α to read the data from the cache memory 11 and to output the data read onto the data bus. Then, the CCTL 14 activates a write control signal γ to write the data on the data bus into a port 13. On the other hand, when Line Sending is specified and the addressed data is not cached in the cache memory 11, the CCTL 14 activates a write control signal δ to read data from the main memory 12 and to output the data read onto the data bus. Then, it activates a write control signal γ to write the data on the data bus into the port 13.

Figure 4:
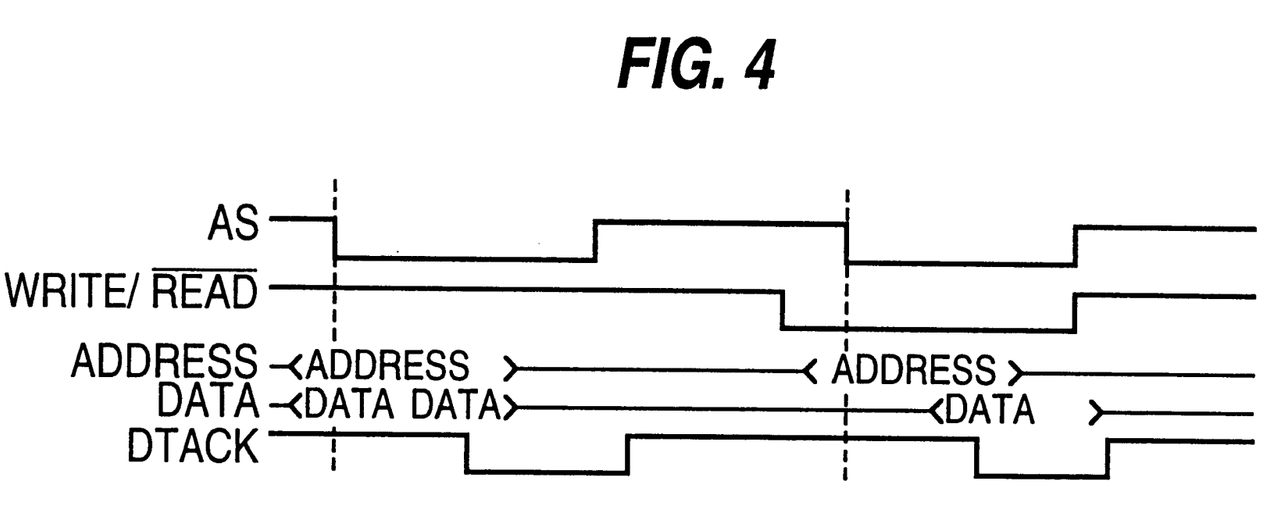
FIG. 4 is a timing diagram illustrating the timing of memory access.
Figure 5:
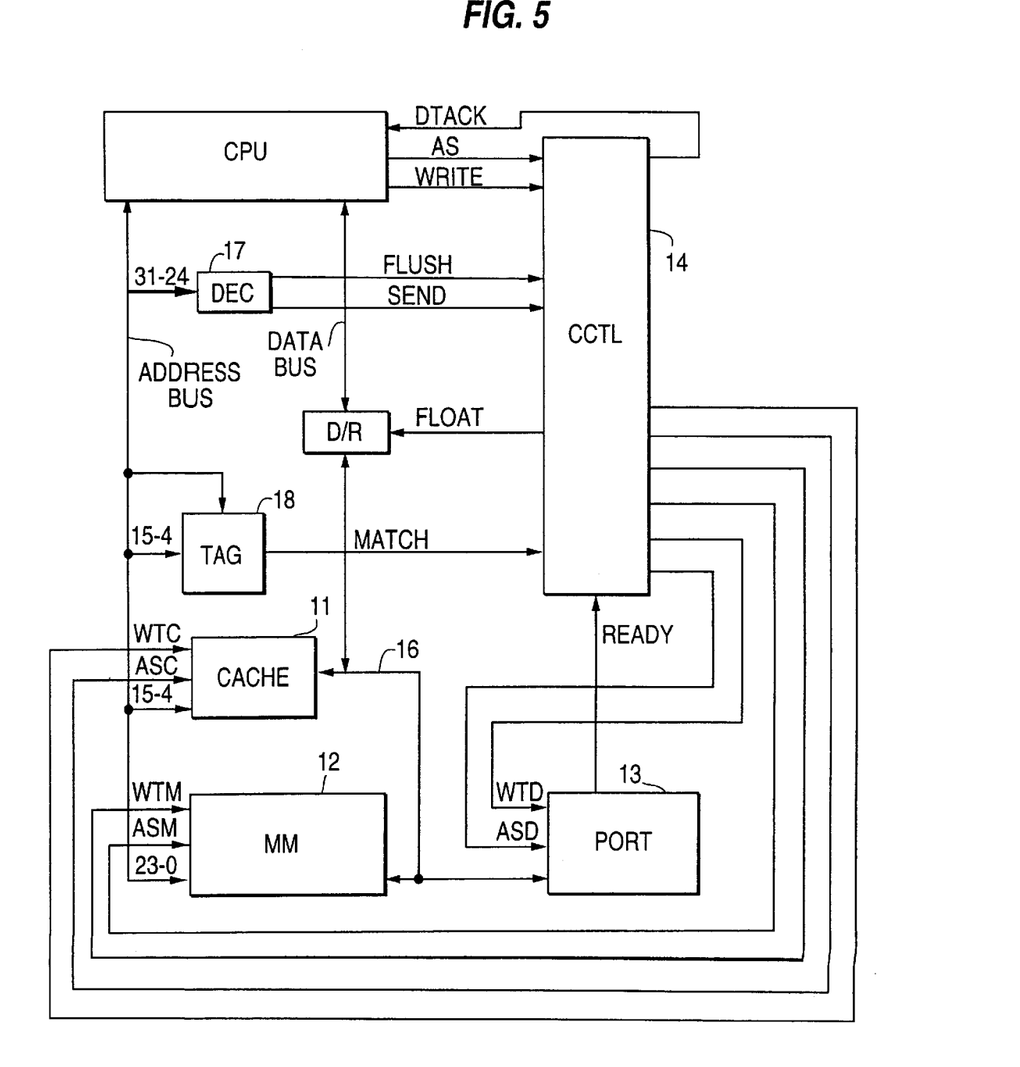
FIG. 5 is a block diagram illustrating a first embodiment of the present invention.

FIG. 4 is a timing diagram illustrating the timing of memory access, and FIG. 5 is a block diagram illustrating a first embodiment of the present invention.

In FIG. 5, the CPU 10 is a microprocessor having a common bus interface comprising a 32-bit address bus and a 32-bit data bus. In the timing diagram illustrated in FIG.

4, CPU 10 performs a read/write operation by sending an address-strobe signal (AS) which validates the address signal on the address bus and by sending a write command (WRITE), then by receiving data-acknowledgement signal (DTACK) from the CCTL 14. A read or write operation is specified depending on whether the WRITE signal is logical 0 ("0") or logical 1 ("1"), respectively. When the AS signal becomes "0", a bus cycle begins and the address on the address bus becomes valid, and when the CPU 10 is to perform a write operation, data on the data bus also becomes valid. The cache memory 11, the main memory 12 or the port 13, upon receipt of data to be written therein, sets the DTACK signal to "0" to inform CPU 10 of completion of the bus cycle.

In a read operation, the cache memory 11, the main memory 12 or the port 13 sets DTACK to "0" when the AS signal is "0" and when data is ready for sending to the CPU 10 to indicate that the data on the data bus is valid.

The address decoder (DEC) 17 decodes the high-order 8 address bits (31-24) of the address bus coming from CPU 10. The DEC 17 outputs FLUSH or SEND instructions depending on the decoded value, that is, hexadecimal 1 or 2, respectively.

The tag circuit (TAG) 18 includes a tag memory for storing the high-order 8 bits (23-16) of the main memory address from which data is cached. TAG 18 compares the contents of a tag memory addressed by address bits 15-4 with the high-order 8 address bits (23-16). When they agree, TAG 18 sets the MATCH signal to "1" to indicate that the addressed data is cached.

The CCTL 14 controls the common bus interface (consisting of the data bus, the address bus and other control signals) to transfer data between the CPU 10, the cache memory 11, the main memory 12 and the port 13. The CCTL 14 accesses the main memory 12 when the MATCH signal is "0", and the cache memory 11 when the MATCH signal is "1". When Line Sending is specified (SEND signal is "1"), the CCTL 14 reads a ready signal ε (or the status register via the common bus interface) to check to see if the port 13 is in a ready state (i.e., the port 13 is ready to write a message therein).

More particularly, when the FLUSH and MATCH signals are both "1", the CCTL 14 sets a write cache signal (WTC) to "0" (i.e., read) and an address strobe cache signal (ASC) to "0" (active) to read data from the cache memory 11, the CCTL 14 then sets a write main memory signal (WTM) to "1" (i.e., write) and an address strobe main memory (ASM) signal to "0" (active) to write the data read from the cache memory 11 into the main memory 12. The CCTL 14 also sets the FLOAT signal to "1" so that the driver/receiver circuits (D/R) may assume a high impedance state to electrically disconnect CPU 10.

Further, when the SEND and MATCH signals are both "1" and the port 13 is in a ready state, the CCTL 14 sets the WTC signal to "0" (i.e., read) and the ASC signal to "0" (active) to read data from the cache memory 11 and to output the data onto the data bus 16. The CCTL 14 then sets a write device signal (WTD) to "1" (i.e., write) and an address strobe device (ASD) signal to "0" (active) to write the data on the data bus 16 into the port 13. In this case, the CCTL 14 also sets the FLOAT signal to "1" to electrically disconnect CPU 10. When the SEND signal is "1" and the MATCH signal is "0" and the port 13 is in a ready state, the CCTL 14 sets the WTM signal to "0" (i.e., read) and the ASM signal to "0" (active) to read data from the main memory 12 and to output the data onto the data bus 16. The CCTL 14 then sets the WTD signal to "1" (i.e., write) and the ASD signal to "0" (active) to write the data on the data bus 16 (i.e., the data read from main memory 12) into the port 13 and sets the FLOAT signal to "1".

Figure 6:
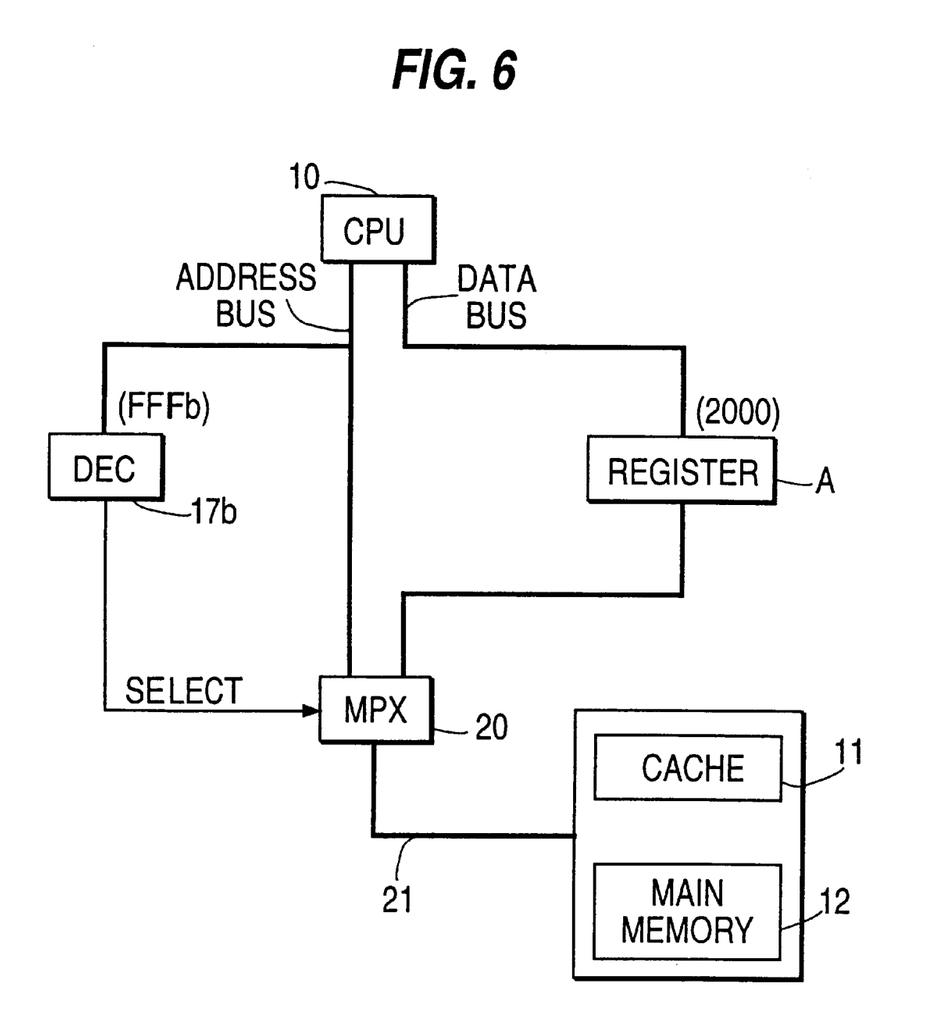
FIG. 6 is a block diagram illustrating a second embodiment of the present invention.

FIG. 6 is a block diagram illustrating a second embodiment of the present invention. Recall, in the first embodiment, a Line Send instruction is recognized by detecting a particular address, that is, "A+SEND" for the address part of a write instruction. A second embodiment realizes the Line Send instruction by providing a multiplexer (MPX) 20 and a decoder 17b.

The multiplexer 20 selects the address bus or the data bus to connect to the address bus 21. The decoder 17b decodes the address bits on the address bus 21 and, when a particular code (e.g., FFFb) is detected, outputs a SELECT signal which enables the multiplexer 20 to select the data bus. A particular memory address FFFb, for example, is for recognizing a Line Send instruction. An address 2000, for example, is where data to be written into the port 13 is stored. Executing an ordinary instruction Load stores 2000 in a register A. Next, when a store instruction "ST A FFFb" is issued, the decoder 17b detects FFFb and outputs the SELECT signal. The multiplexer 20 outputs the contents of register A (i.e., 2000) onto the address bus 21 to read data from cache memory 11 for writing into the port 13.

The present invention can also be applied to a computer system without memory hierarchy, that is, without a cache memory. A block diagram of a third embodiment illustrating this case is shown in FIG. 7.

Figure 7:
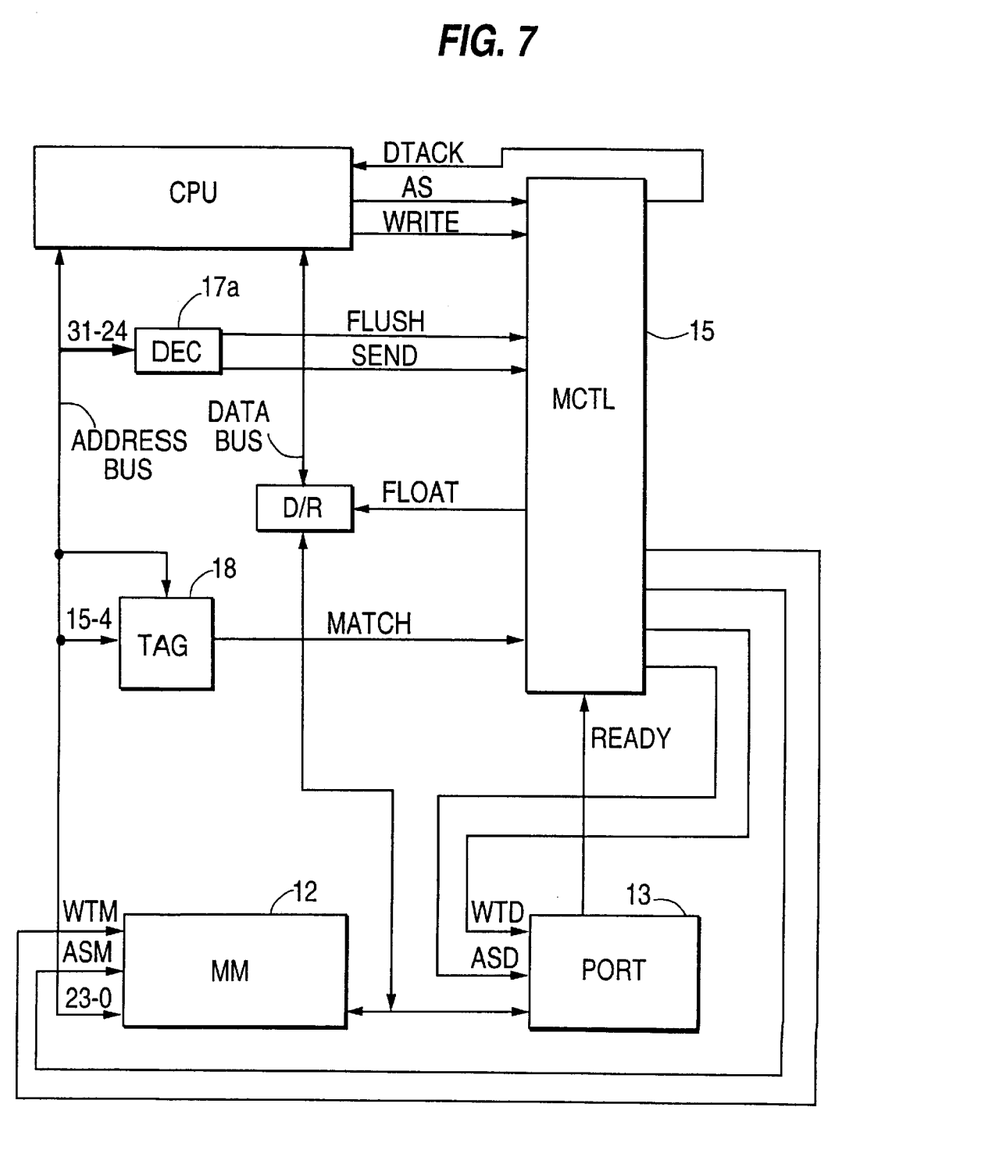
FIG. 7 is a block diagram illustrating a third embodiment of the present invention.

In FIG. 7, a main memory controller (MCTL) 15 is used in place of CCTL 14 shown in FIG. 5. When an address decoder (DEC) 17a interprets a particular address "A+SEND", the MCTL 15 reads data from address A of the main memory 12 and writes the read data into the port 13 in the same way as in the first embodiment where the SEND signal is "1" and the MATCH signal is "0". Thus, a message can be transferred to the port 13 from the main memory 12 just by issuing a Line Send instruction as illustrated in the first embodiment and also in the second embodiment.

Figure 8:
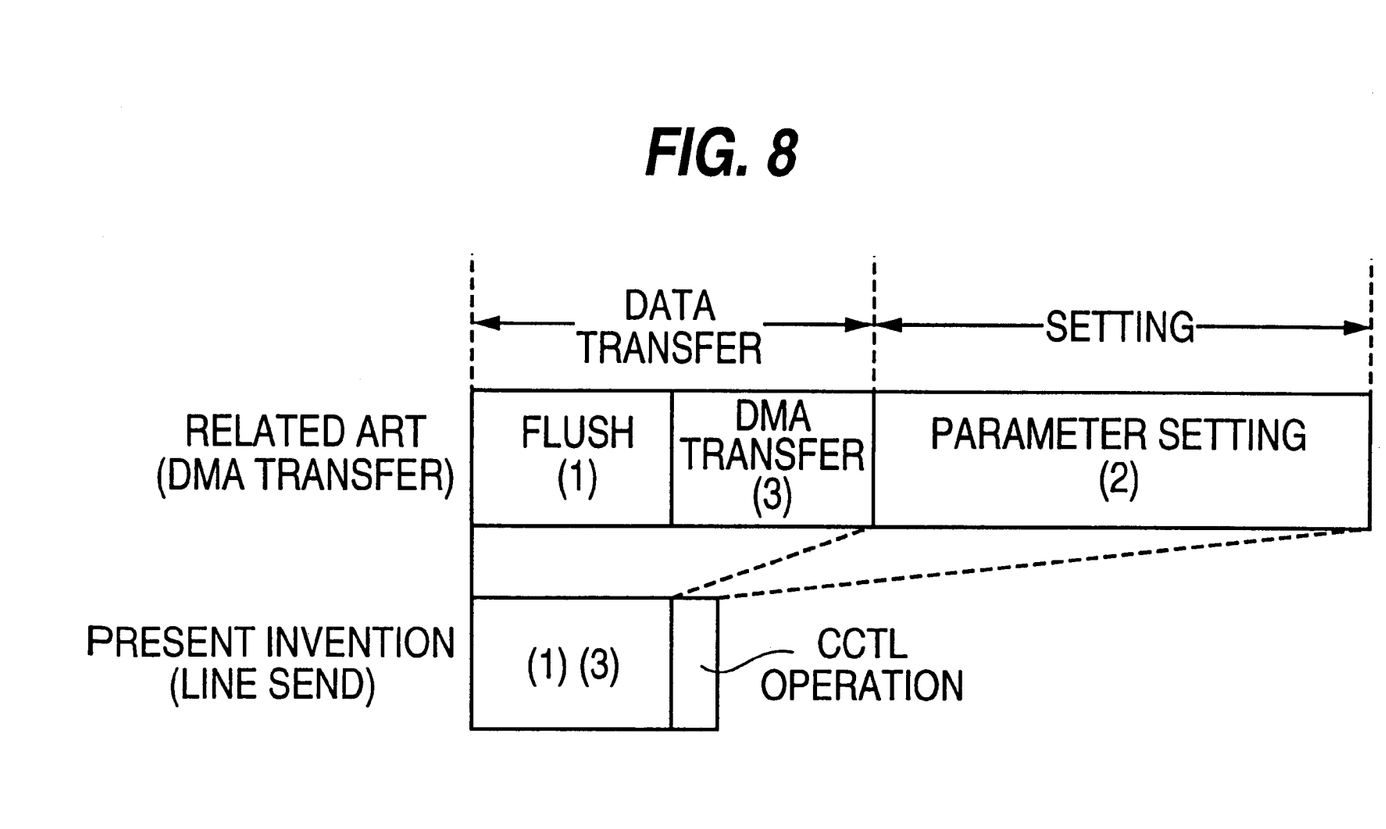
FIG. 8 is a diagram for evaluating the present invention in comparison with the related art.

FIG. 8 is a diagram for evaluating the present invention in comparison with the related art. According to our trial calculations, the time required for transferring data from the cache memory 11 to the port 13 has been reduced to about ¼ of the time required by the related art.

Thus, in a parallel computer system interconnecting a plurality of processor elements, each having a cache memory, through communication paths, the present invention has realized a data transmission control apparatus which can transmit messages between the processor elements quickly, with a reduced load to a program and with a reduced memory area for message buffering.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the exact construction and operation illustrated and described, and accordingly, all suitable modifications and equivalents may be resorted to as falling within the scope of the invention.

What we claim is:

1. Data transmission control apparatus in each of a plurality of processing systems each respectively including at least a memory system having a main memory and a cache memory storing data, said data transmission control apparatus in each of the processing systems controlling data transmission to other of the processing systems via a transmission line, said data transmission control apparatus comprising:

instruction means for addressing data in the memory system using a memory address, for outputting an instruction to transmit the data addressed by said instruction means and when receiving a completion signal, for completing the instruction;

transmission means, operatively connected to the transmission line, for outputting a ready signal when said transmission means is ready to write data therein, for holding data written therein, and for transmitting the data held therein to other of the processing systems;

match detection means for determining whether the data addressed by said instruction means is in the cache memory and for providing a match signal in dependence upon the determining by said match detection means; and     transfer means, based on the instruction and the ready signal, for reading a predetermined length of a data block starting with the data addressed by said instruction means, from one of the cache memory and the main memory based on whether the match signal is one of on and off, and for writing the data block read into said transmission means and thereafter outputting the completion signal to said instruction means.

2. Data transmission control apparatus as recited in claim 1, wherein the memory address includes main memory address bits, and     wherein said match detection means includes         memory means for storing the main memory address bits corresponding to the data stored in the cache memory; and         comparison means for comparing contents of said memory means with the main memory address bits output by said instruction means.

3. Data transmission control apparatus as recited in claim 1, wherein the memory address includes main memory address bits, the main memory address bits include a first part and a second part, and     wherein said match detection means includes         memory means for storing a first part of the main memory address bits corresponding to the data stored in the cache memory;

access means for accessing said memory means using the second part of the main memory address bits; and         comparison means for comparing bit-by-bit contents of said memory means with the first part of the main memory address bits given by said instruction means.

4. Data transmission control apparatus as recited in claim 1, wherein said instruction means outputs an operation code to instruct transmission of the data addressed, and     wherein said instruction means comprises decoder means for decoding the operation code to instruct said transfer means to transfer the data addressed.

5. Data transmission control apparatus as recited in claim 1, wherein the instruction to transmit the data addressed includes at least an address part, and     wherein said instruction means comprises decoder means for decoding the address part to instruct said transfer means to transfer the data addressed.

6. Data transmission control apparatus as recited in claim 1, wherein the memory address includes a main memory address,     wherein the instruction to transmit the data addressed includes at least an address part, the address part having a first part and a second part, the first part giving an instruction to transmit the data addressed and the second part designating the main memory address where the data to be transmitted is stored, and     wherein said instruction means comprises decoder means for decoding the first part to instruct said transfer means to transfer the data addressed.

7. Data transmission control apparatus as recited in claim 1, wherein the memory address includes a main memory address,     wherein the instruction to transmit the data addressed includes at least a first instruction to load a register with the main memory address where the data to be transmitted is stored and a second instruction having an address part, the address part includes a code to instruct said transfer means to transfer the data addressed, and     wherein said instruction means comprises:

decoder means for decoding the address part to detect the code; and         selection means for selecting the contents of said register as the main memory address based on the code detected by said decoder means.

8. A data transmission control apparatus in each of a plurality of processing systems each respectively including a main memory storing data, said data transmission control apparatus in each of the processing systems controlling data transmission to other of the processing systems via a transmission line, said data transmission control apparatus comprising:

instruction means for addressing data in the main memory using a memory address, for providing an instruction to transmit the data addressed by said instruction means and when receiving a completion signal, for completing the instruction;

transmission means, operatively connected to the transmission line, for holding data written therein, for transmitting the data written therein to other of the processing systems, and for outputting a ready signal when said transmission means is ready to write data therein; and     transfer means, based on the instruction and the ready signal, for reading a predetermined length of a data block starting with the data addressed by said instruction means, from the main memory and writing the data block read into said transmission means and thereafter outputting the completion signal to said instruction means.

9. Data transmission control apparatus as recited in claim 8, wherein said instruction means outputs an operation code to instruct transmission of the data addressed, and     wherein said instruction means comprises decoder means for decoding the operation code to instruct said transfer means to transfer the data addressed.

10. Data transmission control apparatus as recited in claim 8, wherein the instruction to transmit the data addressed includes at least an address part, and wherein said instruction means comprises decoder means for decoding the address part to instruct said transfer means to transfer the data addressed.

11. Data transmission control apparatus as recited in claim 8, wherein the memory address includes a main memory address, wherein the instruction to transmit the data addressed includes at least an address part, the address part having a first part and a second part, the first part giving an instruction to transmit the data addressed and the second part designating the main memory address where the data to be transmitted is stored, and wherein said instruction means comprises decoder means for decoding the first part to instruct said transfer means to transfer the data addressed.

12. Data transmission control apparatus as recited in claim 8, wherein the memory address includes a main memory address, wherein the instruction to transmit the data addressed includes at least a first instruction to load a register with the main memory address where the data to be transmitted is stored and a second instruction having an address part, the address part including a code to instruct said transfer means to transfer the data addressed, and wherein said instruction means comprises:

decoder means for decoding the address part to detect the code; and selection means for selecting contents of said register as the main memory address based on the code detected by said decoder means.

13. A processor system of a parallel computer system for transferring data between processor systems of the parallel computer system, said processor system comprising:

main memory means for storing data;

cache means for storing the data;

port means for connecting with other of the processor systems;

address bus means for holding an address to a portion of the data as addressed data;

instruction means for addressing data in the main memory means and in the cache means using a memory address, for outputting an instruction to transmit the data addressed by said instruction means and, when receiving a completion signal, for completing the instruction;

match detection means for determining whether the data addressed by said instruction means is in the cache memory and for outputting a value of a match signal in dependence upon the determining by said match detection means;

cache memory control means for controlling transfer of a predetermined length of a data block starting with the addressed data from one of said cache means and said main memory means to said port means depending upon the value of the match signal, said cache memory control means outputting the completion signal upon completion of said transfer of said predetermined length of a data block; and data bus means for transferring a predetermined length of a data block starting with the addressed data from the one of said cache means and said main memory means to said port means.

14. A processor system as recited in claim 13, wherein said cache means stores a cache contents value corresponding to an address of a first portion of the data stored therein, and wherein said processor system further comprises:

decoder means for receiving a first part of the address and for producing one of a first data transfer instruction and a second data transfer instruction based on the first part of the address; and hit determination means for receiving a second part of the address and for comparing the second part of the address with the cache contents address of said cache means.

15. A processor system as recited in claim 14, wherein said hit determination means is further for producing a hit/miss signal for indicating an outcome of a comparison between the second part of the address with the cache contents address of said cache means, and wherein said cache memory control means receives the hit/miss signal and one of the first and second data transfer instructions produced by said decoder means, and controls transfer of the addressed data from one of said cache means and said main memory means to said port based on the hit/miss signal and the one of the first and second data transfer instructions.

16. A processor system as recited in claim 15, wherein said cache memory control means controls the transfer of the addressed data from said cache memory means to said port when the hit/miss signal indicates a hit, and controls the transfer of the addressed data from said main memory means to said port when the hit/miss signal indicates a miss.

17. A processor system as recited in claim 13, wherein the second portion of the data is a line of data, wherein said processor system further comprises hit detection means for receiving the address of the second portion of the data from said address bus means and for comparing the address with an address corresponding to the first portion of the data stored in said cache means, and wherein said cache memory control means controls transfer of the addressed data based on the comparing by said hit detection means.

18. A method for transferring data between processor systems of a parallel computer system, the processor systems each respectively including at least a main memory unit storing data, a cache unit storing the data, and a port unit for connecting with other of the processor systems, said method comprising the steps of:

(a) addressing, by the processor, data in the main memory unit and in the cache unit using a memory address, and outputting an instruction to transmit the data addressed by instruction means;

(b) receiving, by a cache memory controller, a line send instruction to send a predetermined length of a data block starting with a line of the data to the port unit;

(c) determining, by match detection means, if the data stored in the cache unit includes the data block starting with the line of the data;

(d) transferring the data block starting with the line of the data from the cache unit to the port unit when the determining step determines that data block starting with the line of the data is stored in the cache unit; and (e) transferring the data block starting with the line of the data from the main memory unit to the port unit when the determining step determines that the data block starting with the line of the data is not stored in the cache unit.

19. A method as recited in claim 18, wherein said step (b) comprises the steps of:

(b1) receiving an address including an instruction code portion and a memory location address portion;

(b2) decoding the instruction code portion to identify an instruction; and (b3) determining if the instruction identified in step (b2) is the line send instruction.

20. A method as recited in claim 19, wherein said determining step (c) comprises the steps of:

(c1) comparing the memory location address portion with the cache contents address value; and (c2) determining if the first portion of the data stored in the cache unit includes the line of the data based on said comparing in step (c1).

21. A processor system as recited in claim 13, further comprising:

a central processing unit for issuing instructions, wherein said cache memory control means further comprises:

means for determining whether said instruction is one of a flushing instruction and a line sending instruction, said cache memory control means controlling transfer of the addressed data from said cache means to said main memory means when said instruction is the flushing instruction.

22. A method for controlling data transmission between a plurality of processing systems each respectively including at least a memory system having a main memory and a cache memory storing data, said method controlling data transmission in each of the processing systems to other of the processing systems and comprising the steps of:

addressing data by an instructions means for addressing data in the memory system using a memory address, outputting an instruction to transmit the data addressed by said instruction means and when receiving a completion signal, for completing the instruction;

determining by a match detection means whether the data addressed by said instruction means is in the cache memory and providing a match signal in dependence upon the determining by said match detection means;

outputting a ready signal by a transmission means when said transmission means is ready to write data therein;

reading, based on the instruction and the ready signal, a predetermined length of a data block starting with the data addressed by said instruction means, from one of the cache memory and the main memory based on whether the match signal is one of on and off;

writing the data block into the transmission means and thereafter outputting the completion signal to said instruction means;

holding by the transmission means data written therein; and transmitting the data held in the transmission means to other of the processing systems.

* * * * *